United States Patent [19]
Kilgo et al.

[11] Patent Number: 5,965,469
[45] Date of Patent: Oct. 12, 1999

[54] HIGH THERMAL EXPANSION SEALING GLASS FOR USE IN RADIO FREQUENCY APPLICATIONS

[75] Inventors: Riley D. Kilgo, Albuquerque, N.Mex.; Richard K. Brow, Rolla, Mo.; Larry Kovacic, Albuquerque, N.Mex.

[73] Assignee: Sandia Corporation, Albuquerque, N.Mex.

[21] Appl. No.: 09/045,493

[22] Filed: Mar. 20, 1998

[51] Int. Cl.$^6$ .............. C03C 8/08; C03C 3/17; C03C 3/19
[52] U.S. Cl. .............. 501/48; 501/24; 501/45; 501/47
[58] Field of Search ............. 501/21, 24, 45, 501/47, 48, 52

[56] References Cited

U.S. PATENT DOCUMENTS

| | | | |
|---|---|---|---|
| 3,957,496 | 5/1976 | Eagan | 106/39.8 |
| 4,135,936 | 1/1979 | Ballard, Jr. | 106/39.6 |
| 4,202,700 | 5/1980 | Wilder, Jr. | 106/39.6 |
| 4,248,732 | 2/1981 | Myers et al. | 501/48 |
| 4,348,484 | 9/1982 | Joormann et al. | 501/48 |
| 5,041,019 | 8/1991 | Sharp et al. | 439/559 |
| 5,109,594 | 5/1992 | Sharp et al. | 29/600 |
| 5,262,364 | 11/1993 | Brow et al. | 504/24 |
| 5,367,125 | 11/1994 | Viret | 174/52.4 |

*Primary Examiner*—Michael Marcheschi
*Attorney, Agent, or Firm*—Elmer A. Klavetter

[57] ABSTRACT

The present invention provides a glass composition for hermetically sealing to high thermal expansion materials such as aluminum alloys, stainless steels, and copper alloys, which includes between about 10 and about 25 mole percent $Na_2O$, between about 10 and about 25 mole percent $K_2O$, between about 4 and about 15 mole percent $Al_2O_3$, between about 35 and about 50 mole percent $P_2O_5$, $B_2O_3$ in a concentration not exceeding 10 mole percent, and MXO in a concentration not exceeding 12 mole percent, wherein MXO is a metal oxide selected from the group consisting of PbO, BaO, CaO and MgO or a mixture thereof. This composition is suitable to hermetically seal to components for use in RF-interconnection applications.

4 Claims, No Drawings

HIGH THERMAL EXPANSION SEALING GLASS FOR USE IN RADIO FREQUENCY APPLICATIONS

This invention was made with Government support under Contract No. DE-AC04-94AL85000 awarded by the Department of Energy. The Government has certain rights in the invention.

BACKGROUND OF THE INVENTION

This invention relates generally to glass compositions and more particularly to a high-thermal-expansion, high-durability glass with a sufficiently low dielectric constant to be suitable for use in hermetically-sealed, radio-frequency (RF) applications.

Typically, high reliability RF circuits are packaged in hermetically-sealed steel housings to protect the circuits from corrosive environments and humidity. These sealed housings use electrical interconnections that are also hermetic that penetrate the housing, and are needed to transfer electrical signals into and out of the housing. Hermetic RF-feedthrough interconnections are usually incorporated to transfer the high-frequency electrical signals. The RF interconnections generally comprise an electrically-conductive center conductor pin, an outer electrically conductive housing, and an electrically insulating material, such as an insulating glass, hermetically sealed to the center conductor and the outer housing. These interconnections are typically manufactured from weldable stainless steels and high-temperature, silicate-based, insulating glasses that require sealing temperatures above 900° C. The RF interconnections are installed into the hermetically-sealed housings, which are also made of steel. These packages are used in aerospace applications, such as communications satellites, microwave communications equipment, and military communications and radar systems which require a hermetic seal to avoid contamination and corrosion of the RF devices inside. Being made of steel, these packages contribute to the heavy and undesirable weight of the final application assembly.

Aluminum alloy connectors and housings, being of lighter-weight, are preferred but have not been used for these hermetic assemblies because, heretofore, direct, weldable, hermetic, RF connections with suitable electrical and chemical durability properties joined with aluminum bodies could not be made. A hermetically-sealed, aluminum, RF interconnection must employ an insulating material with both suitable chemical properties and suitable electrical properties. In particular, the dielectric constant of the material must be sufficiently low to permit use in RF applications.

Previous RF connections were generally either made with steel bodies or made with aluminum bodies with a transition joint made of steel between the insulating glass and the aluminum body. The transition joint is a seal made between steel or iron-nickel alloy rings and pins where the seal is explosively bonded to an aluminum ring and then welded into the aluminum housing package. The use of transition joints requires additional processing steps compared to the traditional manufacture of hermetic steel RF connections.

Sharp et al., in U.S. Pat. Nos. 5,041,019 and 5,109,594, issued on Apr. 20, 1991 and May 5, 1992, respectively, describe a connector that utilizes a transition joint where a layer of steel is laser welded to a layer of aluminum, thus enabling a connector to be made that has substantially an aluminum alloy body. These inventions are hermetically sealed transition joints for use with a microwave package. The inventions are seals between steel or Kovar rings and pins. These seals are then explosively bonded to an aluminum ring, which is then welded into the aluminum package. Electronic signals are allowed to enter and exit the package via pins contained within the feed-throughs and power connectors. The feed-throughs contain a pin of desired metal surrounded by a bead of glass which is surrounded by a layer of cold rolled steel, stainless steel and/or iron-nickel alloy. This layer is laser-welded to a second layer of an aluminum alloy. The pin serves as an electrical connection to communicate with the electronic circuit inside the package. The glass provides electronic isolation between the pin and the package. Manufacture of these connectors with transition joints requires additional processing steps for making the steel-to-aluminum joint compared to connectors where the glass is directly attached to a steel or aluminum package. Moreover, the designed package is a microwave package and is not designed for RF applications, where the impedance must be closely matched along the entire connector length.

The reliability of the feed-through with a transition joint is typically very poor. Besides the difficulty of a good attachment during manufacture, these joints commonly fail upon thermal cycling. There are two recognized reasons. First, poor nickel and/or gold plating of the packages, feed-throughs and power connectors results in excessive leaching of the plated metals during soldering, thereby inhibiting soldering. The second reason is mismatched expansion between the aluminum or aluminum alloy of the package and the feed-throughs and power connectors. The coefficient of thermal expansion of aluminum/aluminum alloys is approximately $22 \times 10^{-6}$ in/C/in vs that of cold rolled steel and stainless steel at approximately $12-18 \times 10^{-6}$. This mismatch in expansion during thermal cycling creates stresses which causes loss of the hermeticity and expensive rework and repeat of testing. In frequent situations upon multiple recurrence, the package becomes useless and is discarded.

Viret et al., in U.S. Pat. No. 5,367,125, issued on Nov. 22, 1994, describe an hermetic connector consisting of an aluminum shell, a phosphate-based glass seal and a Cu/Be connecting pin. The connectors described utilize a vitreous or glass material with a required modifying agent for increasing the working temperature range of the glass material. Various embodiments of the invention require pre-oxidation of the aluminum body in a toxic chromic acid bath and Ni-plating and pre-oxidation of the conducting Cu/Be pin. The glass material composition comprises approximately 20 to 50 mole percent of $Na_2O$, approximately 5 to 30 mole percent of BaO, approximately 0.5 to 3 mole percent of $Al_2O_3$ and approximately 40 to 60 mole percent of $P_2O_5$. The embodiments are designed for electrical applications, rather than RF applications.

Compositions formed from glass and ceramics for sealing to molybdenum are disclosed in U.S. Pat. No. 3,957,496, issued to R. J. Eagan on May 18, 1976, and for sealing to stainless steel are disclosed in U.S. Pat. No. 4,135,936, issued to C. P. Ballard, Jr., on Jan. 23, 1979. These compositions each require temperatures in excess of 900° C. to form the seal. The high seal-forming temperatures of these compositions preclude their use in practice with aluminum and aluminum-alloys, since the seal-forming temperatures are greater than the melting points of these metals.

Wilder, Jr., in U.S. Pat. No. 4,202,700, issued on May 13, 1980, discloses a glassy composition adaptable for hermetically sealing to aluminum-based alloys. The composition may either be employed as a glass or glass-ceramic and includes from about 10 to about 60 mole percent $Li_2O$, $Na_2O$, or $K_2O$, from about 5 to about 40 mole percent BaO or CaO, from 0.1 to 10 mole percent $Al_2O_3$ and from 40 to 70 mole percent $P_2O_5$. Although this composition has a thermal expansion coefficient which closely matches the thermal expansion coefficient of stainless steel, its aqueous durability or dissolution rate is relatively poor. This characteristic precludes its use in applications which require long operating lifetimes in humid environments.

Some progress has been made in developing a glass that can be hermetically sealed to materials such as aluminum alloys. Brow et al., in U.S. Pat. No. 5,262,364, issued on Nov. 16, 1993, describe a glass composition for hermetically sealing to high thermal expansion materials such as aluminum alloys, stainless steels, copper, and copper/beryllium alloys. The composition includes between about 10 and about 25 mole percent $Na_2O$, between about 10 and about 25 mole percent $K_2O$, between about 5 and about 15 mole percent $Al_2O_3$, between about 35 and about 50 mole percent $P_2O_5$, and between about 5 and about 15 mole percent of one of PbO, BaO, and mixtures thereof. The composition may also include between 0 and about 5 mole percent $Fe_2O_3$ and between 0 and about 10 mole percent $B_2O_3$.

The dielectric constant of the insulator material used to make any coaxial RF interconnection is important since the dielectric constant, κ, technically derived from the electrical relative permittivity of the material, controls the electrical characteristic impedance of the interconnection for a given physical geometry.

The electrical Characteristic Impedance ($Z_0$) of a coaxial geometry RF interconnection is inversely proportional to the dielectric constant and directly proportional to diameter of the interconnection, as given by the relationship, $Z_0 \sqrt{\kappa} \log_{10} (D_{i/o})$ where:

| | |
|---|---|
| $Z_0$ | is the Characteristic Impedance of the geometry; |
| κ | is the dielectric constant of the insulator material; |
| $D_i$ | is the inner diameter of the outer conductor; |
| $d_o$ | is the outer diameter of the inner conductor. |

Therefore, given a constant center conductor diameter and desired Characteristics Impedance (e.g., 50 ohms), a higher dielectric constant means that the outer conductor must have a larger diameter and the overall weight of the RF interconnection will increase. Advantageous are therefore glasses that can be sealed to aluminum alloys and that have low dielectric constants.

To make a direct, weldable, hermetic RF interconnection with aluminum bodies, insulating glass compositions are required that can be sealed to the aluminum at temperatures below the melting point of aluminum alloys, that have thermal expansion coefficients that can be matched to the conducting pin material, that can be impedanced-matched to make a suitable RF interconnections and that have high chemical durability, mechanical strength and low gas permeability. The melting point of typical aluminum alloys is about 550° C. compared to that of a conventional silicate glass which has a sealing temperature generally higher than about 1000° C. Glass transition temperatures of less than approximately 450° C. are desired. Furthermore, the thermal expansion coefficient of copper and copper-beryllium alloys preferred for high electrical conductivity pins is generally higher than that of conventional silicate glasses. Thermal expansion coefficients between about 160 and about $210 \times 10^{-7}$/° C. are desired.

SUMMARY OF THE INVENTION

This invention provides a high-thermal-expansion glass composition that has suitable chemical and thermal properties and suitably low dielectric constants. The composition has a thermal expansion coefficient in a range of between about 160 and about $210 \times 10^{-7}$/° C. to permit satisfactory hermetic sealing to high thermal expansion materials such as copper, stainless steels, aluminum alloys, and copper alloys. The composition also has a low dissolution rate (in 70° C. water) of less than approximately $3 \times 10^{-6}$ g/cm²-min to permit use in devices subjected to humid environments over long periods of time. Importantly, the composition has dielectric constants of less than approximately 8 measured at frequencies from 10 to 1000 MHz.

In accordance with the present invention, there is provided a glass composition for hermetically sealing to aluminum or aluminum-alloy materials comprising between about 10 and about 25 mole percent $Na_2O$, between about 10 and about 25 mole percent $K_2O$, between about 4 and about 15 mole percent $Al_2O_3$, between about 35 and about 50 mole percent $P_2O_5$, $B_2O_3$ in a concentration not exceeding 10 mole percent, and MXO in a concentration not exceeding 12 mole percent, wherein MXO is a metal oxide selected from the group consisting of BaO, PbO, CaO, and MgO or a mixture thereof. Preferred is a glass composition where no PbO or BaO is present.

The insulating glass utilized in the invention has a sufficiently low dielectric constant to permit RF interconnections to be produced with a variety of geometries and sizes and that has sufficiently high chemical durability and mechanical strength to have improved operating and shelf life and sufficiently low gas permeability to provide a reliable long-term hermetic seal.

These and other features and advantages of the present invention will become apparent to those skilled in the art upon a reading of the detailed description wherein there are described illustrative embodiments of the invention.

DETAILED DESCRIPTION OF THE INVENTION

The present invention relates to a family of high-thermal-expansion, alkali aluminophosphate glass compositions for hermetically sealing to high expansion materials such as copper alloys, stainless steels, and aluminum alloys. Importantly, these glass compositions have dielectric constants of about 8 or less to permit the use of these compositions in RF applications.

Suitable dissolution rates, in 70° C. deionized water, of between about $3 \times 10^{-6}$ and $2 \times 10^{-9}$ g/cm²-min are desired and are achieved by the glass according to the present invention. Suitable strength and gas permeability values are also achieved, as evidenced by the invention meeting criteria for thermal shock and hermeticity checks. Typical seals are hermetic to He-leak rates $<10^{-9}$ cc-He/sec and survive standard thermal shock tests (e.g., five cycles, -35° C. to +85° C.). Desirable glass thermal expansion coefficients are achieved that match pin materials, including Be—Cu alloys (viz., $16-19.5 \times 10^{-6}$/° C.) and AlCu alloys. Glass transition temperatures under about 425° C. are achieved to ensure that hermetic seals can be made below about 525° C. Importantly, glass dielectric constants of less than about 8, and more preferably, less than 7 are obtained, as measured at a range of frequencies of 10 to 1000 MHz at 20° C. These properties are required to provide proper electrical impedance matching and stability.

In general, the glass compositions comprise the following constituents: $Na_2O$, $K_2O$, $Al_2O_3$, $P_2O_5$, $B_2O_3$, and one or more metal oxide selected from the group consisting of BaO, PbO, CaO, and MgO or a mixture thereof. More particularly, each composition comprises between about 10 and about 25 mole percent $Na_2O$, between about 10 and about 25 mole percent $K_2O$, between about 4 and about 15 mole percent $Al_2O_3$, between about 35 and about 50 mole percent $P_2O_5$, $B_2O_3$ in a concentration not exceeding 10 mole percent, and MXO in a concentration not exceeding 12 mole percent, wherein MXO is a metal oxide selected from the group consisting of BaO, PbO, CaO and MgO or a mixture thereof. Preferred is a glass composition where no PbO and no BaO are present. Glass compositions with no PbO or BaO were found to provide the most advantageous dielectric constant while maintaining acceptable thermal expansion coefficient and dissolution rate values. The use of MgO and CaO has been shown to reduce the dielectric constant of the glass without significantly affecting other desirable properties.

Some preferred compositions within the above component ranges are described in Table I. The corresponding properties of those compositions are listed in Table II. The compositions indicated here and those indicated hereinafter are given solely by way of nonlimitative examples.

TABLE I

Compositions (mole %) of Example Aluminum Sealing Glasses According to the Present Invention

| Glass | $Na_2O$ | $K_2O$ | MXO | $Al_2O_3$ | $B_2O_3$ | $P_2O_5$ |
|---|---|---|---|---|---|---|
| ALSG-RF2 | 16.0 | 23.5 | 0.0 | 7.5 | 8.0 | 45.0 |
| ALSG-RF3 | 19.8 | 19.8 | 0.0 | 7.5 | 8.0 | 45.0 |
| ALSG-RF4 | 23.5 | 16.0 | 0.0 | 7.5 | 8.0 | 45.0 |
| ALSG-RF5 | 23.0 | 16.5 | 0.0 | 10.0 | 5.5 | 45.0 |
| ALSG-RF9 | 16.5 | 20.0 | 3.0 MgO | 7.5 | 8.0 | 45.0 |
| ALSG-RF10 | 16.0 | 19.5 | 4.0 CaO | 7.5 | 8.0 | 45.0 |
| ALSG-RF11 | 20.0 | 16.0 | 4.0 CaO | 12.0 | 8.0 | 40.0 |
| ALSG-RF13 | 18.0 | 18.0 | 6.0 CaO 6.0 MgO | 12.0 | 6.0 | 42.0 |
| ALSG-RF15 | 16.0 | 9.8 | 4.0 CaO | 7.5 | 8.0 | 45.0 |
| ALSG-RF16 | 13.2 | 13.2 | 0.0 | 7.5 | 8.0 | 45.0 |
| ALSG-27 | 15.0 | 22.0 | 2.8 BaO | 7.5 | 8.0 | 45.0 |
| ALSG-21 | 14.1 | 15.2 | 4.6 BaO 4.6 PbO | 7.4 | 4.1 | 50.0 |
| ALSG-32 | 15.0 | 18.0 | 9.0 PbO | 12.0 | 6.0 | 40.0 |

TABLE II

Properties of Example Aluminum Sealing Glasses According to the Present Invention.

| Glass | Dielectric Constant, 1000 MHz, 20° C. | Thermal Exp. Coef., $10^{-7}/°$ C., RT-300° C. | $T_g$ (° C.) | Dissolution Rate, 70° C. $H_2O$, g/cm² min |
|---|---|---|---|---|
| ALSG-RF2 | 6.9 | 195 | 368 | $2.5 \times 10^{-7}$ |
| ALSG-RF3 | 7.0 | 191 | 382 | $6.3 \times 10^{-7}$ |
| ALSG-RF4 | 7.14 | 184 | 394 | $4.0 \times 10^{-7}$ |
| ALSG-RF5 | 7.33 | 179 | 415 | $2.5 \times 10^{-7}$ |
| ALSG-RF9 | 6.9 | 178 | 422 | $4.0 \times 10^{-7}$ |
| ALSG-RF10 | 6.4 | 190 | 415 | $4.2 \times 10^{-7}$ |
| ALSG-RF11 | 7.1 | 160 | 435 | $3.8 \times 10^{-7}$ |
| ALSG-RF13 | 7.1 | nm | nm | nm |
| ALSG-RF15 | 7.0 | 160 | 401 | nm |
| ALSG-RF16 | 6.9 | 176 | 388 | nm |
| ALSG-27 | nm | 175 | 408 | $3.2 \times 10^{-7}$ |
| ALSG-21 | 7.4 | nm | nm | nm |
| ALSG-32 | 8.1 | 175 | 394 | $3.2 \times 10^{-9}$ | nm - not measured.

The composition ranges of the present invention are similar to those of the Brow '364 patent for the $Na_2O$, $K_2O$, $Al_2O_3$, $P_2O_5$, $B_2O_3$ constituents but differ in the types and range of composition for the metal oxide compositions. In particular, the Brow '364 patent includes between about 5 and about 15 mole percent of one of PbO, BaO, and mixtures thereof. Measurements of dielectric constants on materials in the composition ranges taught by Brow '364 give values of dielectric constants greater than 8 or even 9 under conditions similar to those used in testing the compositions of the present invention. For one composition of the Brow '364 patent, where the composition of BaO was 12 mole percent and PbO was 5 mole percent, the measured dielectric constant value at 1000 MHz was greater than 8.1. In another composition of Brow '364, where the composition of BaO was 5 mole percent and PbO was 12 mole percent, the measured dielectric constant was greater than 8.7. In another composition of the Brow '364 patent, where the composition of BaO was 9 mole percent and PbO was 12 mole percent, the dielectric constant was greater than 9.

Using the compositions of the present invention, where the metal oxides are selected from a group consisting of BaO, PbO, CaO, and MgO or a mixture thereof, suitable dielectric constant values of less than 8 or even 7 can be achieved, particularly with composition values of the metal oxides in the lower part of the range of 0 to about 12 mole percent, as shown in Tables I and II. Preferred is a glass composition where little to no PbO and no BaO are present. Glass compositions with little or no PbO or BaO were found to provide advantageous dielectric constants. For example, glass composition ALSG-RF2, with no PbO or BaO had a dielectric constant of 6.9. Even ALSG-RF21, with APbO and BaO at compositions of less than 5 mole percent, was able to achieve a dielectric constant of 7.4. The use of MgO and CaO was shown to be advantageous by further reducing the dielectric constant of the glass without significantly affecting other desirable properties, as shown by glass compositions ALSG-RF9 and ALSG-RF10.

A glass is prepared from a mixture of $Na_2O$, $K_2O$, $Al_2O_3$, $P_2O_5$, $B_2O_3$, and one or more metal oxide selected from the group consisting of BaO, PbO, CaO, and MgO or a mixture thereof, with initial quantities set to yield the final product. Each of these preferred glass compositions may be made by conventional melt techniques. Raw materials are melted in crucibles in air at temperatures around 1000–12000° C. for up to 5 hours. Alumina crucibles contaminate the glass; platinum crucibles are preferred.

The thermal expansion coefficients of the glass compositions, determined by dilatometry, were calculated from the total glass expansion measured from room temperature to just below the glass transition temperature. The dissolution rates were determined from weight changes, normalized to sample surface areas, after specified times in deionized water at 70° C. The dielectric constant was measured by standard techniques at frequencies from 10 MHz to 1000 MHz at 20° C.

Each of the glass compositions described herein has been hermetically sealed to either stainless steel, copper alloys or aluminum alloys. Satisfactory hermetic seals were achieved. Seals were tested to ensure hermeticity to He-leak rates $<10^{-9}$ cc-He/sec and survival of standard thermal shock tests (e.g., five cycles, −35° C. to +85° C.).

In one embodiment, a glass designated ALSG-RF4 was prepared from a mixture of $Na_2CO_3$, $K_2CO_3$, $Al_2O_3$, anhydrous $B_2O_3$, and $NH_4H_2PO_4$, with initial quantities set to yield the final product of 23.5% $Na_2O$, 16% $K_2O$, 7.5% $Al_2O_3$, 8.0% $B_2O_3$, and 45.0% $P_2O_5$, with the percentages in mole percent. This mixture was calcined at approximately 600° C. overnight, then heated in a platinum crucible to approximately 1000° C. Dry oxygen or air was bubbled through the melt at about 1000° C. for five hours, to ensure homogeneity and to reduce contamination by water. After an additional hour at 1000° C. for fining, the melt was cast into molds, cooled, then annealed at approximately 380° C. Other examples of BaO- and PbO-free compositions are given in Table I. A second, specific glass example, designated ALSG-RF9 (Table I), was prepared from the same starting materials, with the addition of MgO. The replacement of MgO by CaO produces other useful glasses.

The foregoing discussion discloses and describes merely exemplary embodiments of the present invention. One skilled in the art will readily recognize from such discussion, and from the accompanying drawings and claims, that various changes and modifications can be made therein without departing from the spirit and scope of the invention as defined in the following claims.

We claim:

1. A glass composition for hermetically sealing to aluminum or aluminum alloys consisting essentially of between about 10 and about 25 mole percent $Na_2O$, between about 10 and about 25 mole percent $K_2O$, between about 4 and about 15 mole percent $Al_2O_3$, between about 35 and about 50 mole percent $P_2O_5$, between 0 and about 10 mole percent $B_2O_3$, and MXO in a concentration not exceeding 12 mole percent, wherein MXO is a metal oxide selected from the group consisting of CaO, MgO and a mixture thereof, wherein said glass composition has a dielectric constant less than 8, a thermal expansion coefficient between about $160 \times 10^{-7}$ and $210 \times 10^{-7}/°$ C., and a dissolution rate in deionized water of less than approximately $6 \times 10^{-7}$ g/cm$^2$-min.

2. The glass composition according to claim 1 wherein said composition consists essentially of about 16 mole percent $Na_2O$, about 23.5 mole percent $K_2O$, about 7.5 mole percent $Al_2O_3$, about 45 mole percent $P_2O_5$, and about 8 mole percent $B_2O_3$.

3. The glass composition according to claim 1 wherein said composition consists essentially of about 16.5 mole percent $Na_2O$, about 20.0 mole percent $K_2O$, about 7.5 mole percent $Al_2O_3$, about 45 mole percent $P2O_5$, about 8 mole percent $B_2O_3$, and about 3 mole percent MgO.

4. A glass composition for hermetically sealing to aluminum or aluminum alloys consisting essentially of between about 10 and about 25 mole percent $Na_2O$, between about 10 and about 25 mole percent $K_2O$, between about 4 and about 15 mole percent $Al_2O_3$, between about 35 and about 50 mole percent $P_2O_5$, between 0 and about 10 mole percent $B_2O_3$, and MgO in a concentration not exceeding 12 mole percent, wherein said glass composition has a dielectric constant less than 8, a thermal expansion coefficient between about $160 \times 10^{-7}$ and $210 \times 10^{-7}/°$ C., and a dissolution rate in deionized water of less than approximately $6 \times 10^{31\ 7}$ g/cm$^2$-min.

* * * * *